United States Patent
Zhao et al.

(10) Patent No.: US 11,705,570 B2
(45) Date of Patent: Jul. 18, 2023

(54) FLOW BATTERY SYSTEM AND LARGE SCALE FLOW BATTERY ENERGY STORAGE DEVICE

(71) Applicant: DALIAN RONGKEPOWER CO., LTD, Liaoning (CN)

(72) Inventors: Haijun Zhao, Liaoning (CN); Huamin Zhang, Liaoning (CN); Xiangkun Ma, Liaoning (CN); Jiayun Shao, Liaoning (CN); Hongbo Wang, Liaoning (CN); Ting Chigan, Liaoning (CN)

(73) Assignee: DALIAN RONGKEPOWER CO., LTD, Liaoning (CN)

( * ) Notice: Subject to any disclaimer, the term of this patent is extended or adjusted under 35 U.S.C. 154(b) by 52 days.

(21) Appl. No.: 17/463,800

(22) Filed: Sep. 1, 2021

(65) Prior Publication Data
US 2021/0399326 A1 Dec. 23, 2021

Related U.S. Application Data

(62) Division of application No. 16/326,104, filed as application No. PCT/CN2016/095676 on Aug. 17, 2016, now abandoned.

(51) Int. Cl.
*H01M 8/18* (2006.01)
*H01M 8/04298* (2016.01)
(Continued)

(52) U.S. Cl.
CPC ......... *H01M 8/18* (2013.01); *H01M 8/04298* (2013.01); *H01M 8/188* (2013.01);
(Continued)

(58) Field of Classification Search
CPC .... H01M 8/18; H01M 8/188; H01M 8/04298; H01M 8/24
See application file for complete search history.

(56) References Cited

U.S. PATENT DOCUMENTS

| 9,893,385 B1 | 2/2018 | Nayar et al. |
| 2012/0189875 A1* | 7/2012 | Fischel ................. B01J 14/005 429/7 |
| 2014/0204632 A1* | 7/2014 | Noetzold ............... H01F 30/04 363/37 |

FOREIGN PATENT DOCUMENTS

| CN | 201845830 U | 5/2011 |
| CN | 102354761 A | 2/2012 |

(Continued)

OTHER PUBLICATIONS

English translation of DE102016112004 A1, Flow battery stack, Trumpf Huttinger GMBH+ Co KG, Jan. 4, 2018 (Year: 2018).*

(Continued)

*Primary Examiner* — Niki Bakhtiari
*Assistant Examiner* — Adam J Francis
(74) *Attorney, Agent, or Firm* — NKL Law; Allen Xue (57) ABSTRACT

The present disclosure discloses a flow battery system and a large-scale flow battery energy storage device. The flow battery system comprises multiple flow batteries; each of the flow batteries comprises a battery pack A, a battery pack B, a battery pack C, and a set of electrolyte circulation system used by the battery pack A, the battery pack B and the battery pack C; the battery pack A, the battery pack B and the battery pack C comprised in each flow battery are independent of each other in the circuit. According to the present disclosure, at least two sets of electrolyte circulation system are saved under the same power scale, such that the system stability is improved while the cost is reduced.

6 Claims, 4 Drawing Sheets

(51) Int. Cl.
H01M 8/24 (2016.01)
H02M 3/335 (2006.01)
(52) U.S. Cl.
CPC ......... *H01M 8/24* (2013.01); *H02M 3/33576* (2013.01); *Y02E 60/50* (2013.01)

(56) References Cited

FOREIGN PATENT DOCUMENTS

| | | | | |
|---|---|---|---|---|
| CN | 102723518 A | 10/2012 | | |
| CN | 102810698 A | 12/2012 | | |
| CN | 102867975 A | 1/2013 | | |
| CN | 105702994 A | 6/2016 | | |
| DE | 102016112004 A1 * | 1/2018 | | |
| WO | WO-2016023989 A1 * | 2/2016 | ............. | G01R 31/36 |

OTHER PUBLICATIONS

English translation of WO2016023989 A1, Method for measuring the charge state of a flow battery stack and battery management system, Feb. 18, 2016 (Year: 2016).*

* cited by examiner

FLOW BATTERY SYSTEM AND LARGE SCALE FLOW BATTERY ENERGY STORAGE DEVICE

CROSS REFERENCE TO RELATED APPLICATIONS

This application is a divisional application of U.S. patent application Ser. No. 16/326,104, filed Feb. 15, 2019, which is a U.S. national stage application of PCT/CN2016/095676, filed Aug. 17, 2016.

TECHNICAL FIELD

The present disclosure belongs to the technical field of flow battery, and more particularly relates to a flow battery system and a large-scale flow battery energy storage device.

BACKGROUND ART

At present, there are several main ways for large-scale grouping schemes of flow batteries at home and abroad: (1) series connection of flow battery systems; (2) parallel connection of flow battery systems; (3) a combination of series connection and parallel connection of flow battery systems. The existing large-scale grouping scheme for flow batteries has the following defects:

1. The number of stages in series and parallel of each cell stack in the flow battery system is limited. Since the same set of electrolyte storage tanks and pipelines is shared among the cell stacks in the same system, cell stacks connected in series with multiple-stage undergoes a higher voltage, which causes an increase of leakage current in the system pipelines and a damage of equipment; and, the parallel connection will cause a too low voltage and a too high current, such that the system is too low in efficiency and fails to be converted into a desired AC system;

2. The flow battery systems are connected in series and in parallel. In the case of series or parallel connection among multiple flow battery systems, the pipelines among the systems are strictly required to be independent of each other, and due to the internal resistance deviation of each flow battery system, the SOCs of the respective systems are nonuniform, after several cycles of charge and discharge, a cask effect will be formed, resulting in a complete system collapse. In view of this problem, in the prior art, all positive storage tanks of each set of flow battery system are connected through pipelines and all negative storage tanks are connected through pipelines to balance the SOCs of the respective systems. However, this will result in a relatively large leakage current and an energy loss due to the connected pipelines among the systems during charging and discharging, meanwhile, a high current easily burns the equipment and affects equipment usage rate.

Moreover, the flow battery system is converted into a three-phase AC (Alternating Current) and connected to AC network through certain series connection, parallel connection or series-parallel connection. At present, energy storage converters used in the technical field of flow batteries are three-phase full-control-bridge converters, the existing technology in which power modules comprised in the converter are connected in series or in parallel is applied to a static var generator (SVG), but the application of the flow battery system has not been involved. The existing converter also has an H-bridge cascade converter structure, wherein the H-bridge series voltage is higher, and the flow battery cannot meet the high voltage requirement. In addition, in the H-bridge series structure, the voltages of the respective power modules are superposed, therefore the flow battery system is required to be completely independently insulated. However, the power units of the existing flow battery system are connected through an electrolyte circulation pipeline and cannot be separated, so the H-bridge cascade converter structure is not suitable for the existing flow battery system.

SUMMARY OF THE INVENTION

The present disclosure is directed to the above problems, and provides a flow battery system and a large-scale flow battery energy storage device.

The technical means of the present invention is as follows:

A flow battery system, comprises:

multiple flow batteries, each of the flow batteries comprises a battery pack A, a battery pack B, a battery pack C, and a set of electrolyte circulation system shared by the battery pack A, the battery pack B and the battery pack C; the battery pack A, the battery pack B and the battery pack C comprised in each flow battery are independent of each other in a circuit;

further, the battery pack A, the battery pack B or the battery pack C comprises multiple cell stacks which are connected in series with each other in the circuit; the electrolyte circulation system at least comprises a positive storage tank, a negative storage tank and an electrolyte circulation pipeline;

further, the battery pack A, the battery pack B and the battery pack C are electrically isolated from each other and are equipotential; and further, the energy storage scale of the flow battery system is changed by increasing the quantity of the flow batteries.

A large-scale energy storage flow battery device, comprises:

any one of the above-described flow battery systems; and an energy storage converter provided with multiple power units, wherein the multiple power units are divided into three groups, i.e., a power unit group A, a power unit group B and a power unit group C; a cascaded AC side of the power unit group A is connected between an A phase line and a neutral line of a three-phase AC, and a DC side of the power unit group A is connected to the battery packs A comprised in the flow batteries respectively; a cascaded AC side of the power unit group B is connected between a B phase line and the neutral line of the three-phase AC, and a DC side of the power unit group B is connected to the battery packs B comprised in the flow batteries respectively; a cascaded AC side of the power unit group C is connected between a C phase line and the neutral line of the three-phase AC, and a DC side of the power unit group C is connected to the battery packs C comprised in the flow batteries respectively;

further, a DC/DC isolated conversion module is respectively arranged between each power unit and each of the battery pack A, the battery pack B and the battery pack C; or the energy storage device further comprises a transformer A, a transformer B and a transformer C; two ends of a primary winding of the transformer A are connected to the A phase line and the neutral line of the three-phase AC respectively; the transformer A is connected to AC sides of the power units of the power unit group A respectively through a plurality of secondary windings; two ends of a primary winding of the transformer B are connected to the B phase line and the neutral line of the three-phase AC respectively; the transformer B is connected to AC sides of the power units of the power unit group B respectively through a plurality of secondary windings; two ends of a primary winding of the transformer C are connected to the C phase line and the neutral line of the three-phase AC respectively; the transformer C is connected to AC sides of the power units of the power unit group C respectively through a plurality of secondary windings;

further, the respective power units comprised in the power unit group A have the same input/output parameters; the respective power units comprised in the power unit group B have the same input/output parameters; the respective power units comprised in the power unit group C have the same input/output parameters; the power unit uses an H-bridge conversion circuit.

further, an SOC difference between the battery packs A of the respective flow battery systems is reduced by adjusting a voltage of the AC side of each power unit of the power unit group A; an SOC difference between the battery packs B of the respective flow battery systems is reduced by adjusting a voltage of the AC side of each power unit of the power unit group B; an SOC difference between the battery packs C of the respective flow battery systems is reduced by adjusting a voltage of the AC side of each power unit of the power unit group C.

further, in a charging process, by adjusting a voltage of the AC side of each power unit of the power unit group A, the power absorbed by the battery pack whose SOC value meets a first preset condition is lower than the power adsorbed by the battery pack whose SOC value meets a second preset condition among multiple battery packs A; by adjusting a voltage of the AC side of each power unit of the power unit group B, the power absorbed by the battery pack whose SOC value meets the first preset condition is lower than the power adsorbed by the battery pack whose SOC value meets the second preset condition among multiple battery packs B; by adjusting a voltage of the AC side of each power unit of the power unit group C, the power absorbed by the battery pack whose SOC value meets the first preset condition is lower than the power adsorbed by the battery pack whose SOC value meets the second preset condition among multiple battery packs C;

in a discharging process, by adjusting the voltage of the AC side of each power unit of the power unit group A, the power released by the battery pack whose SOC value meets the first preset condition is higher than the power released by the battery pack whose SOC value meets the second preset condition among multiple battery packs A; by adjusting a voltage of the AC side of each power unit of the power unit group B, the power released by the battery pack whose SOC value meets the first preset condition is higher than the power released by the battery pack whose SOC value meets the second preset condition among multiple battery packs B; by adjusting a voltage of the AC side of each power unit of the power unit group C, the power released by the battery pack whose SOC value meets the first preset condition is higher than the power released by the battery pack whose SOC value meets the second preset condition among multiple battery packs C;

further, the $i^{th}$ power unit in the power unit group A is modulated by means of a modulating wave $\Delta V_{CAi}=k_1 \cdot k_2 \cdot \Delta SOC_{Ai} \cdot V_{CA}$; the $i^{th}$ power unit in the power unit group B is modulated by means of a modulating wave $\Delta V_{CBi}=k_1 \cdot k_2 \cdot \Delta SOC_{Bi} \cdot V_{CB}$; the $i^{th}$ power unit in the power unit group C is modulated by means of a modulating wave $\Delta V_{CCi}=k_1 \cdot k_2 \cdot \Delta SOC_{Ci} \cdot V_{CC}$;

wherein, $\Delta V_{CAi}$ is the modulating wave for modulating the $i^{th}$ power unit in the power unit group A; $\Delta V_{CBi}$ is the modulating wave for modulating the $i^{th}$ power unit in the power unit group B; $\Delta V_{CCi}$ is the modulating wave for modulating the $i^{th}$ power unit in the power unit group C;

$$k_1 = \begin{cases} 1 & I_d \geq 0 \\ -1 & I_d < 0 \end{cases};$$

$k_2$=0-2; $\Delta SOC_{Ai}=SOC_A-SOC_{Ai}$, wherein $SOC_A$ is a SOC average value of the multiple battery packs A, $$SOC_A = \frac{1}{n}(SOC_{A1} + SOC_{A2} + \ldots + SOC_{An});$$

$SOC_{Ai}$ is a SOC value of the $i^{th}$ battery pack A; $V_{CA}$ is an A phase voltage; $SOC_B$ is a SOC average value of the multiple battery packs B, $$SOC_B = \frac{1}{n}(SOC_{B1} + SOC_{B2} + \ldots + SOC_{Bn});$$

$SOC_{Bi}$ is a SOC value of the $i^{th}$ battery pack B; $V_{CB}$ is a B phase voltage; $SOC_C$ is a SOC average value of the multiple battery packs C, $$SOC_C = \frac{1}{n}(SOC_{C1} + SOC_{C2} + \ldots + SOC_{Cn});$$

$SOC_{Ci}$ is a SOC value of the $i^{th}$ battery pack C; $V_{CC}$ is a C phase voltage; i=1, 2, . . . n; $I_d$ is a total current of the DC side of the energy storage converter.

Due to the adoption of the above technical solution, the flow battery system and the large-scale flow battery energy storage device as provided by the present disclosure can maintain the reference potential of each battery pack unchanged and relatively save the cost of energy storage inverter, without requiring a higher pressure-resistant design. Each flow battery connected with the power unit group A, the power unit group B and the power unit group C constitutes a level together. The powers of the battery packs comprised in different levels can be controlled, so that the SOC between the battery packs of different levels can be adjusted, and the problem of SOC inconsistency between different levels is solved. When the SOCs of battery packs in each level have a large difference, the SOCs can tend to be converged by controlling the energy storage converter. When expanding the flow battery system, it is only needed to increase the power of the single battery pack, and the charge and discharge currents are unchanged; at least two sets of electrolyte circulation systems are saved under the same power scale, improve the system stability while saving the cost. The flow batteries do not need to be connected in series and in parallel many times, which can greatly reduce the leakage current of the electrolyte and improve the overall efficiency and safety of the flow batteries. Compared with other topological energy storage systems under the same capacity and voltage conditions, the DC voltage and current of the battery clusters connected by this structure are lower, which reduces the scale of series-parallel connection of the flow batteries and reduces the impact of the battery cask effect on a large-capacity battery energy storage system.

BRIEF DESCRIPTION OF THE DRAWINGS

FIG. 4-a, FIG. 4-b and FIG. 4-c illustrate schematic diagrams of states of SOC average values of multiple battery packs A, multiple battery packs B or multiple battery packs C and the input power conditions of the corresponding power unit group A, power unit group B or power unit group C.

Wherein, 1—flow battery system; 2—power unit group A; 3—DC/DC isolated conversion module; 4—power unit group B; 5—power unit group C; 6—transformer A; 7—transformer B; 8—transformer C.

DETAILED DESCRIPTION OF THE PREFERRED EMBODIMENTS

Figure 1:
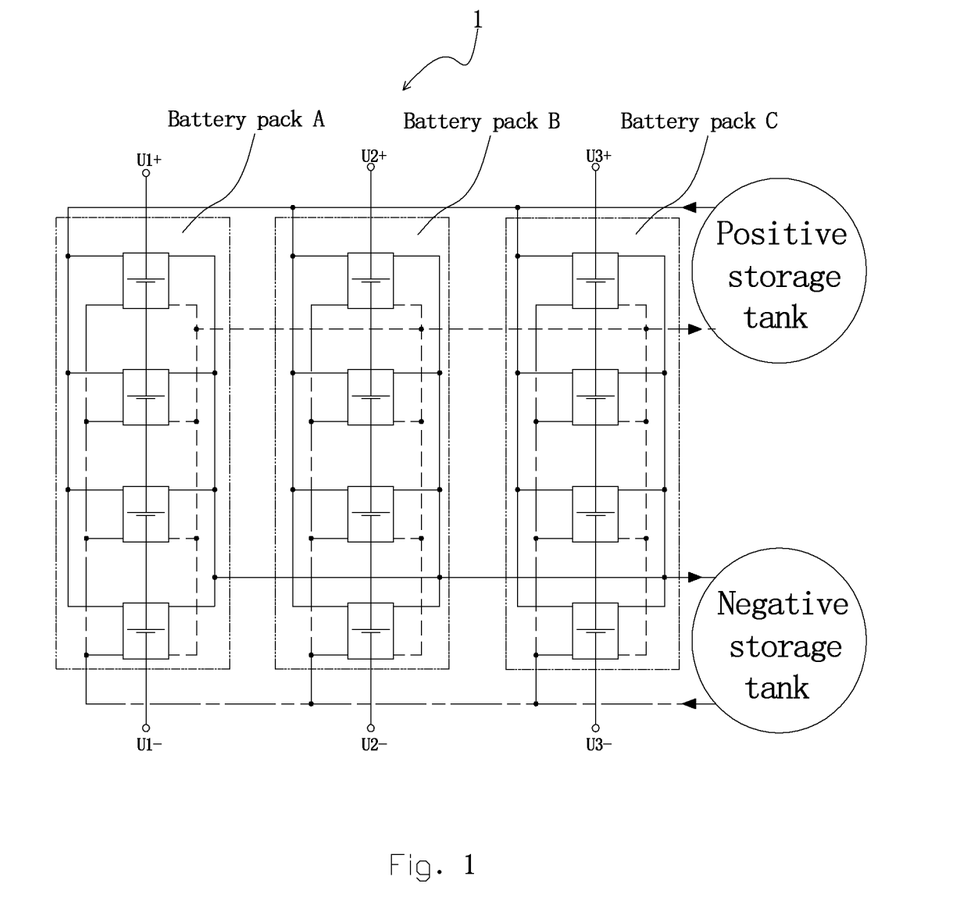
FIG. 1 illustrates a structural schematic diagram of the flow battery system of the present disclosure.

A flow battery system 1 as shown in FIG. 1, comprises: multiple flow batteries, each of the flow batteries comprises a battery pack A, a battery pack B, a battery pack C, and a set of electrolyte circulation system shared by the battery pack A, the battery pack B and the battery pack C; the battery pack A, the battery pack B and the battery pack C comprised in each flow battery are independent of each other in a circuit; further, the battery pack A, the battery pack B or the battery pack C comprises multiple cell stacks which are connected in series with each other in the circuit; the electrolyte circulation system at least comprises a positive storage tank, a negative storage tank and an electrolyte circulation pipeline; further, the battery pack A, the battery pack B and the battery pack C are electrically isolated from each other and are equipotential; further, the energy storage scale of the flow battery system 1 is changed by increasing the quantity of the flow batteries.

Figure 2:
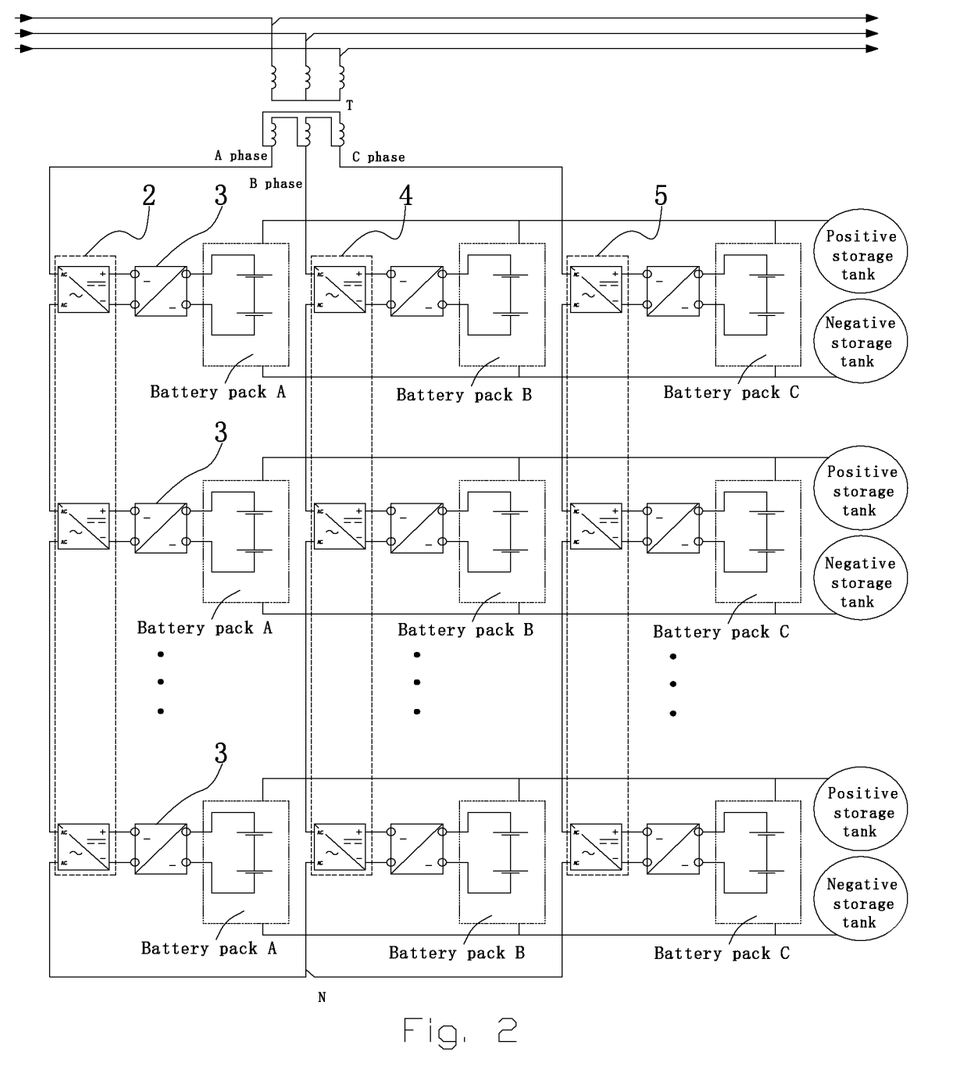
FIG. 2 and FIG. 3 illustrate structural schematic diagrams of the energy storage device of the present disclosure.
Figure 3:
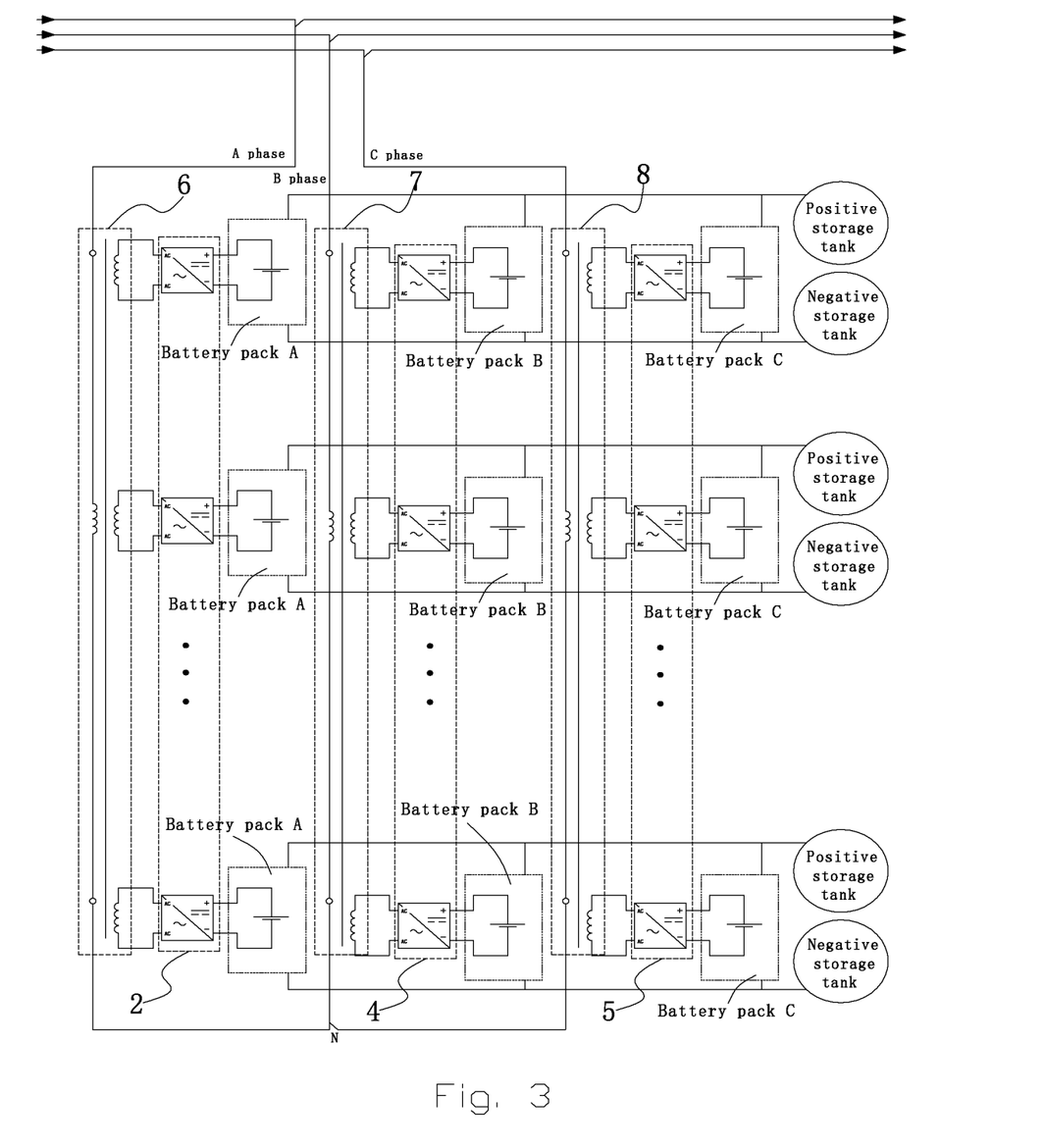

A large-scale flow battery energy storage device as shown in FIG. 2 and FIG. 3, comprises: any one of the flow battery systems 1 of the present disclosure; and an energy storage converter provided with multiple power units, wherein the plurality of power units are divided into three groups, i.e., a power unit group A 2, a power unit group B 4 and a power unit group C 5; a cascaded AC side of the power unit group A 2 is connected between an A phase line and a neutral line of a three-phase AC, and a DC side of the power unit group A 2 is connected to the battery packs A comprised in the respective flow batteries respectively; a cascaded AC side of the power unit group B 4 is connected between a B phase line and the neutral line of the three-phase AC, and a DC side of the power unit group B 4 is connected to the battery packs B comprised in the respective flow batteries respectively; a cascaded AC side of the power unit group C 5 is connected between a C phase line and the neutral line of the three-phase AC, and a DC side of the power unit group C 5 is connected to the battery packs C comprised in the respective flow batteries respectively. Further, a DC/DC isolated conversion module 3 is respectively arranged between each power unit and each of the battery pack A, the battery pack B and the battery pack C; or the energy storage device further comprises a transformer A 6, a transformer B 7 and a transformer C 8; two ends of a primary winding of the transformer A 6 are connected to the A phase line and the neutral line of the three-phase AC respectively; the transformer A 6 is connected to AC sides of the respective power units of the power unit group A 2 respectively through a plurality of secondary windings; two ends of a primary winding of the transformer B 7 are connected to the B phase line and the neutral line of the three-phase AC respectively; the transformer B 7 is connected to AC sides of the respective power units of the power unit group B 4 respectively through a plurality of secondary windings; two ends of a primary winding of the transformer C 8 are connected to the C phase line and the neutral line of the three-phase AC respectively; the transformer C 8 is connected to AC sides of the respective power units of the power unit group C 5 respectively through a plurality of secondary windings. Further, the respective power units comprised in the power unit group A 2 have the same input/output parameters; the respective power units comprised in the power unit group B 4 have the same input/output parameters; the respective power units comprised in the power unit group C 5 have the same input/output parameters; the power unit uses an H-bridge conversion circuit. Further, a SOC difference between the battery packs A of the respective flow battery systems 1 is reduced by adjusting a voltage of the AC side of each power unit of the power unit group A 2; a SOC difference between the battery packs B of the respective flow battery systems 1 is reduced by adjusting a voltage of the AC side of each power unit of the power unit group B 4; a SOC difference between the battery packs C of the respective flow battery systems 1 is reduced by adjusting a voltage of the AC side of each power unit of the power unit group C 5. Further, in a charging process, by adjusting a voltage of the AC side of each power unit of the power unit group A 2, the power absorbed by the battery pack whose SOC value meets a first preset condition is lower than the power adsorbed by the battery pack whose SOC value meets a second preset condition among multiple battery packs A; by adjusting a voltage of the AC side of each power unit of the power unit group B 4, the power absorbed by the battery pack whose SOC value meets the first preset condition is lower than the power adsorbed by the battery pack whose SOC value meets the second preset condition among multiple battery packs B; by adjusting a voltage of the AC side of each power unit of the power unit group C 5, the power absorbed by the battery pack whose SOC value meets the first preset condition is lower than the power adsorbed by the battery pack whose SOC value meets the second preset condition among multiple battery packs C; in a discharging process, by adjusting the voltage of the AC side of each power unit of the power unit group A 2, the power released by the battery pack whose SOC value meets the first preset condition is higher than the power released by the battery pack whose SOC value meets the second preset condition among multiple battery packs A; by adjusting a voltage of the AC side of each power unit of the power unit group B 4, the power released by the battery pack whose SOC value meets the first preset condition is higher than the power released by the battery pack whose SOC value meets the second preset condition among multiple battery packs B; by adjusting a voltage of the AC side of each power unit of the power unit group C 5, the power released by the battery pack whose SOC value meets the first preset condition is higher than the power released by the battery pack whose SOC value meets the second preset condition among multiple battery packs C. Further, the $i^{th}$ power unit in the power unit group A 2 is modulated by means of a modulating wave $\Delta V_{CAi}=k_1 \cdot k_2 \cdot \Delta SOC_{Ai} \cdot V_{CA}$; the $i^{th}$ power unit in the power unit group B 4 is modulated by means of a modulating wave $\Delta V_{CBi}=k_1 \cdot k_2 \cdot \Delta SOC_{Bi} \cdot V_{CB}$; the $i^{th}$ power unit in the power unit group C 5 is modulated by means of a modulating wave $\Delta V_{CCi}=k_1 \cdot k_2 \cdot \Delta SOC_{Ci} \cdot V_{CC}$; wherein $\Delta V_{CAi}$ is the modulating wave for modulating the $i^{th}$ power unit in the power unit group A 2; $\Delta V_{CBi}$ is the modulating wave for modulating the $i^{th}$ power unit in the power unit group B 4; $\Delta V_{CCi}$ is the modulating wave for modulating the $i^{th}$ power unit in the power unit group C 5;

$$k_1 = \begin{cases} 1 & I_d \geq 0 \\ -1 & I_d < 0 \end{cases};$$

$k_2$=0-2; $\Delta SOC_{Ai}=SOC_A-SOC_{Ai}$, wherein $SOC_A$ is a SOC average value of the multiple battery packs A, $$SOC_A = \frac{1}{n}(SOC_{A1} + SOC_{A2} + \ldots + SOC_{An});$$

$SOC_{Ai}$ is a SOC value of the $i^{th}$ battery pack A; $V_{CA}$ is an A phase voltage; $SOC_B$ is an SOC average value of the multiple battery packs B, $$SOC_B = \frac{1}{n}(SOC_{B1} + SOC_{B2} + \ldots + SOC_{Bn});$$

$SOC_{Bi}$ is a SOC value of the $i^{th}$ battery pack B; $V_{CB}$ is a B phase voltage; $SOC_C$ is a SOC average value of the multiple battery packs C, $$SOC_C = \frac{1}{n}(SOC_{C1} + SOC_{C2} + \ldots + SOC_{Cn});$$

$SOC_{Ci}$ is an SOC value of the $i^{th}$ battery pack C; $V_{CC}$ is a C phase voltage; i=1, 2, . . . n; $I_d$ is a total current of the DC side of the energy storage converter. The first preset condition may be that a SOC value of the battery pack X is higher than or equal to an average value of SOC values of multiple battery packs X. The battery pack X is the battery pack A, the battery pack B or the battery pack C; that is, for the multiple battery packs A, during the charging process, the power absorbed by some of the battery packs A among the multiple battery packs A is lower than the power absorbed by the remaining battery packs A; and during the discharging process, the power released by some of the battery packs A is higher than the power released by the remaining battery packs A. Here, the SOC values of the some of the battery packs A are higher than or equal to the average value of the SOC values of the multiple battery packs A, and the SOC values of the remaining battery packs A are lower than the average value of the SOC values of the multiple battery packs A. Similarly, for multiple battery packs B, during the charging process, the power absorbed by some of the battery packs B among the multiple battery packs B is lower than the power absorbed by the remaining battery packs B; and during the discharging process, the power released by some of the battery packs B is higher than the power released by the remaining battery packs B. Here, the SOC values of the some of the battery packs B are higher than or equal to the average value of the SOC values of the multiple battery packs B, and the SOC values of the remaining battery packs B are lower than the average value of the SOC values of the multiple battery packs B. For multiple battery packs C, during the charging process, the power absorbed by some of the battery packs C among the multiple battery pack C is lower than the power absorbed by the remaining battery packs C; and during the discharging process, the power released by some of the battery packs C is higher than the power released by the remaining battery packs C. Here, the SOC values of the some of the battery packs C are higher than or equal to the average value of the SOC values of the multiple battery packs C, and the SOC values of the remaining battery packs C are lower than the average value of the SOC values of the multiple battery packs C.

A transformation ratio Ki of each secondary winding of the transformer A 6, the transformer B 7 or the transformer C 8 of the present disclosure may be determined according to system requirements; multiple battery packs constitutes a battery matrix. Each row of the matrix is an independently controllable flow battery. The flow battery system 1 comprises multiple flow batteries, The circuit connection of multiple flow batteries is implemented by means of series connection of energy storage converters or transformers in each set of flow batteries, each row of battery packs is electrically isolated and is equipotential. According to the present disclosure, the phases A, B and C are isolated by using multi-tapped transformer or energy storage converter, and are thus equipotential; the corresponding power units and the flow battery units are also equipotential in the circuit, and are independent of each other in the circuit. The battery pack A, the battery pack B and the battery pack C share a set of electrolyte circulation system and a set of storage tanks, that is, the capacities of the flow batteries on the three phases A, B and C are completely identical, i.e., there is only one SOC capacity in the same level, and SOC does not need to be adjusted, thereby ensuring that the outputs of the three phases A, B and C are the same exactly, accompanied with three-phase equalization and stable operation of AC outputs of the system. In addition, the power units are shared in three phases A, B and C of the same level. In addition, the energy storage device also has a certain redundancy function, when there is malfunction in any of the flow batteries, it can be switched off by a circuit breaker to ensure that the remaining flow batteries operate properly.

Figure 4A:
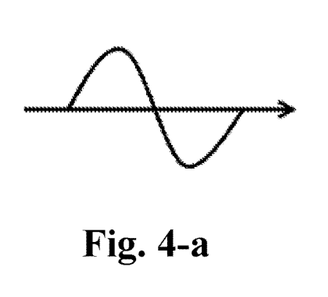
Figure 4B:
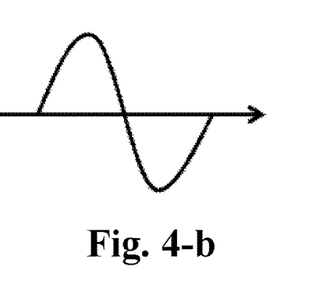
Figure 4C:
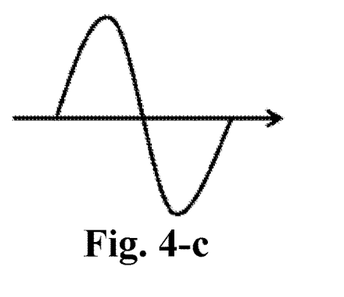

FIG. 2 and FIG. 3 show a structural schematic diagram of the energy storage device of the present disclosure. As shown in FIG. 2, the A phase line, the B phase line and the C phase line are further connected to network via a main transformer T. The energy storage converter may use a three-phase full-control-bridge circuit structure, the electrolyte circulation system comprises a positive storage tank, a negative storage tank and electrolyte circulation pipelines, and also comprises circulating pump; the electrolyte circulation pipelines comprises electrolyte inlet pipeline from the positive storage tank to the cell stacks in each of the battery packs, electrolyte return pipeline from the cell stacks in each of the battery packs to the positive storage tank, electrolyte inlet pipeline from the negative storage tank to each of the cell stacks in each of the battery packs, and electrolyte return pipeline from the cell stacks in each of the battery packs to the negative storage tank. The cell stacks in each of the battery pack A, the battery pack B and the battery pack C are connected in series respectively and have the same cell stack current; there are three sets of voltages (U1+, U1−), (U2+, U2−), (U3+, U3−) inside each flow battery, which correspond to the battery pack A, the battery pack B and the battery pack C respectively; a DC/DC isolated transformation module 3 is disposed between each power unit and its corresponding battery pack A, battery pack B and battery pack C, the DC/DC isolated conversion module 3 can use a multiple chopper DC isolation boosted circuit, and the potential isolation between the power units can be realized by the multiple chopper DC isolation boosted circuit. The transformer A 6, the transformer B 7 and the transformer C 8 in FIG. 3 can function as potential isolation. The power units use H-bridge conversion circuit, and has the advantages of high voltage, large capacity, good output waveform, easy expansion and achievable redundancy. The present disclosure can realize the SOC equalization in the phase of the energy storage device, and the SOC equalization in the phase refers to reducing the SOC difference between the battery packs A of the flow batteries, and reducing the SOC difference between the battery packs B of the flow batteries, or reducing the SOC difference between the battery packs C of the flow batteries. Since the currents flowing through the AC sides of the power units in the power units A 2 cascaded on the AC sides are the same, in the case of keeping the A phase voltage unchanged, adjusting the voltage of the AC side of each power unit in the phase, thereby realizing differentiated control of input power or output power of each power unit, and then achieving adjustment of SOC deviation in the phase; the power unit group A 2 here may also be the power unit group B 4 or the power unit group C 5; correspondingly, the A phase voltage may also be the B phase voltage or the C phase voltage. Further, the $i^{th}$ power unit in the power unit group A 2 is modulated by means of a modulating wave $\Delta V_{CAi}=k_1 \cdot k_2 \cdot \Delta SOC_{Ai} \cdot V_{CA}$; the $i^{th}$ power unit in the power unit group B 4 is modulated by means of a modulating wave $\Delta V_{CBi}=k_1 \cdot k_2 \cdot \Delta SOC_{Bi} \cdot V_{CB}$; the $i^{th}$ power unit in the power unit group C 5 is modulated by means of a modulating wave $\Delta V_{CCi}=k_1 \cdot k_2 \cdot \Delta SOC_{Ci} \cdot V_{CC}$; therefore, the battery pack with a large SOC value releases more power with a larger-amplitude modulating wave during the discharging process and absorbs less power with a smaller-amplitude modulating wave during the charging process, the battery pack with a small SOC value releases less power with a smaller-amplitude modulating wave during the discharging process and absorbs more power with a larger-amplitude modulating wave during the charging process. According to this rule, through the charge and discharge adjustment of different speeds, the SOCs of the respective battery packs tend to be finally converged. FIG. 4-a, FIG. 4-b and FIG. 4-c are schematic diagrams of states of SOC average values of multiple battery packs A, multiple battery packs B or multiple battery packs C and the input power conditions of the corresponding power unit group A 2, power unit group B 4 or power unit group C 5. As shown in FIG. 4-a, when the SOC average values of the multiple battery packs A, the multiple battery packs B or the multiple battery packs C are lower, the corresponding power unit A 2, the power unit group B 4 or the power unit group C 5 outputs less; as shown in FIG. 4-b, when the SOC average values of the multiple battery packs A, the multiple battery packs B or the multiple battery packs C are normal, the corresponding power unit A 2, the power unit group B 4 or the power unit group C 5 outputs normally; as shown in FIG. 4-c, when the SOC average values of the multiple battery packs A, the multiple battery packs B or of the multiple battery packs C are higher, the corresponding power unit A 2, the power unit group B 4 or the power unit group C 5 outputs more.

The flow battery system and the large-scale flow battery energy storage device as provided by the present disclosure can maintain a reference potential of each battery pack unchanged and relatively save the cost of the energy storage inverter, without requiring a higher pressure resistant design. Each flow battery connected with the power unit group A, the power unit group B and the power unit group C constitutes a level together. The powers of the battery packs comprised in different levels can be controlled, so that the SOC between the battery packs of different levels can be adjusted, and the problem of SOC inconsistency between different levels is solved. When the SOCs of the battery packs in each of levels have a large difference, the SOCs may be tend to be converged by controlling the energy storage converter. When expanding the flow battery system, it is only need to increase the power of the single battery pack, and the charge and discharge currents are unchanged. At least two sets of electrolyte circulation systems are saved under the same power scale, improve the system stability while saving the cost. The flow batteries do not need to be connected in series and in parallel many times, which can greatly reduce the leakage current of the electrolyte and improve the overall efficiency and safety of the flow batteries. Compared with other topological energy storage systems under the same capacity and voltage conditions, the DC voltage and current of the battery clusters connected by this structure are lower, which reduces the scale of series-parallel connection of the flow batteries and reduces the impact of the battery cask effect on a large-capacity battery energy storage system.

The above content only refers to preferred embodiments of the present disclosure, but the protection scope of the present disclosure is not limited thereto. Any equivalents or modifications of the technical solutions and the inventive concepts thereof within the technical disclosed by the present disclosure are intended to be included within the protection scope of the present disclosure.

The invention claimed is:

1. A flow battery energy storage device, comprising:
a plurality of flow battery units, a plurality of inverters A, a plurality of inverters B, a plurality of inverters C, and a three-phase transformer,
wherein each flow battery unit comprises:
a battery pack A, a battery pack B, a battery pack C, and an electrolyte circulation system connected to the battery pack A, the battery pack B, and the battery pack C,
wherein the battery pack A is coupled to Phase A of the three-phase transformer via a circuit A comprising one of the plurality of inverters A,
wherein the battery pack B is coupled to Phase B of the three-phase transformer via a circuit B comprising one of the plurality of inverters B,
wherein the battery pack C is coupled to Phase C of the three-phase transformer via a circuit C comprising one of the plurality of inverters C,
wherein the circuit A further comprises an isolated DC/DC convertor A or a transformer A, the circuit B further comprises an isolated DC/DC convertor B or a transformer B, and the circuit C further comprises an isolated DC/DC convertor C or a transformer C so that the battery pack A, the battery pack B, and the battery pack C are electrically isolated from one another,
wherein the plurality of inverters A are tandemly connected to form a power unit group A, the plurality of inverters B are tandemly connected to form a power unit group B, and a plurality of inverters C are tandemly connected to form a power unit group C,
wherein the power unit group A is connected to an A phase line and a neutral line of the three-phase transformer, the power unit group B is connected to a B phase line and the neutral line of the three-phase transformer, and the power unit group C is connected to a C phase line and the neutral line of the three-phase transformer, and
wherein an SOC difference among the battery packs A of the plurality of flow battery units is reduced by adjusting a voltage of the AC side of each power unit of the power unit group A; an SOC difference among the battery packs B of the plurality of flow battery units is reduced by adjusting a voltage of the AC side of each power unit of the power unit group B; an SOC difference among the battery packs C of the respective flow battery systems is reduced by adjusting a voltage of the AC side of each power unit of the power unit group C.

2. The flow battery energy storage device according to claim 1, wherein two ends of a primary winding of the transformer A are connected to the A phase line and the neutral line of the three-phase transformer respectively and a secondary winding of the transformer A is coupled to the AC side of the inverter A.

3. The flow battery energy storage device according to claim 1, wherein all power units in the power unit group A have the same input/output parameters; all power units comprised in the power unit group B have the same input/output parameters; all power units comprised in the power unit group C have the same input/output parameters; the power unit comprises an H-bridge conversion circuit.

4. The flow battery energy storage device according to claim 1, wherein:
in a charging process, by adjusting a voltage of the AC side of each power unit of the power unit group A, the power absorbed by the battery pack whose SOC value meets a first preset condition is lower than the power adsorbed by the battery pack whose SOC value meets a second preset condition among multiple battery packs A; by adjusting a voltage of the AC side of each power unit of the power unit group B, the power absorbed by the battery pack whose SOC value meets the first preset condition is lower than the power adsorbed by the battery pack whose SOC value meets the second preset condition among multiple battery packs B; by adjusting a voltage of the AC side of each power unit of the power unit group C, the power absorbed by the battery pack whose SOC value meets the first preset condition is lower than the power adsorbed by the battery pack whose SOC value meets the second preset condition among multiple battery packs C;
in a discharging process, by adjusting the voltage of the AC side of each power unit of the power unit group A, the power released by the battery pack whose SOC value meets the first preset condition is higher than the power released by the battery pack whose SOC value meets the second preset condition among multiple battery packs A; by adjusting a voltage of the AC side of each power unit of the power unit group B, the power released by the battery pack whose SOC value meets the first preset condition is higher than the power released by the battery pack whose SOC value meets the second preset condition among multiple battery packs B; by adjusting a voltage of the AC side of each power unit of the power unit group C, the power released by the battery pack whose SOC value meets the first preset condition is higher than the power released by the battery pack whose SOC value meets the second preset condition among multiple battery packs C.

5. The flow battery energy storage device according to claim 4, wherein the $i^{th}$ power unit in the power unit group A is modulated by modulating wave $\Delta V_{CAi} = k_1 \cdot k_2 \cdot \Delta SOC_{Ai} \cdot V_{CA}$; the $i^{th}$ power unit in the power unit group B is modulated by modulating wave $\Delta V_{CBi} = k_1 \cdot k_2 \cdot \Delta SOC_{Bi} \cdot V_{CB}$; the $i^{th}$ power unit in the power unit group C is modulated by modulating wave $\Delta V_{CCi} = k_1 \cdot k_2 \cdot \Delta SOC_{Ci} \cdot V_{CC}$;

wherein, $\Delta V_{CAi}$ is the modulating wave for modulating the $i^{th}$ power unit in the power unit group A; $\Delta V_{CBi}$ is the modulating wave for modulating the $i^{th}$ power unit in the power unit group B; $\Delta V_{CCi}$ is the modulating wave for modulating the $i^{th}$ power unit in the power unit group C;

$$k_1 = \begin{cases} 1 & I_d \geq 0 \\ -1 & I_d < 0 \end{cases};$$

$k_2=0-2$; $\Delta SOC_{Ai}=SOC_A-SOC_{Ai}$, wherein $SOC_A$ is a SOC average value of the multiple battery packs A, $$SOC_A = \frac{1}{n}(SOC_{A1} + SOC_{A2} + \ldots + SOC_{An});$$

$SOC_{Ai}$ is a SOC value of the $i^{th}$ battery pack A; $V_{CA}$ is an A phase voltage; $SOC_B$ is a SOC average value of the multiple battery packs B, $$SOC_B = \frac{1}{n}(SOC_{B1} + SOC_{B2} + \ldots + SOC_{Bn});$$

$SOC_{Bi}$ is a SOC value of the $i^{th}$ battery pack B; $V_{CB}$ is a B phase voltage; $SOC_C$ is a SOC average value of the multiple battery packs C, $$SOC_C = \frac{1}{n}(SOC_{C1} + SOC_{C2} + \ldots + SOC_{Cn});$$

$SOC_{Ci}$ is a SOC value of the $i^{th}$ battery pack C; $V_{CC}$ is a C phase voltage; $i=1, 2, \ldots n$; $I_d$ is a total current of the DC side of the energy storage converter.

6. The flow battery energy storage device according to claim 1, wherein the battery pack A, the battery pack B, and the battery pack C each comprises a plurality of fuel cell stacks that are serially connected, and the electrolyte circulation system comprises a positive electrolyte storage tank, a negative electrolyte storage tank, and an electrolyte circulation pipeline.

* * * * *